US010086794B2

(12) United States Patent
Jaradi et al.

(10) Patent No.: US 10,086,794 B2
(45) Date of Patent: Oct. 2, 2018

(54) LOAD LIMITING RETRACTOR WITH HALL EFFECT SWITCH

(71) Applicant: Ford Global Technologies, LLC, Dearborn, MI (US)

(72) Inventors: Dean M. Jaradi, Macomb, MI (US); Mohammed Omar Faruque, Ann Arbor, MI (US); Iskander Farooq, Novi, MI (US); Robert William McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 626 days.

(21) Appl. No.: 14/747,012

(22) Filed: Jun. 23, 2015

(65) Prior Publication Data
US 2016/0375857 A1 Dec. 29, 2016

(51) Int. Cl.
*B60R 22/343* (2006.01)
*B60R 22/46* (2006.01)
*B60R 22/10* (2006.01)

(52) U.S. Cl.
CPC .......... *B60R 22/343* (2013.01); *B60R 22/105* (2013.01); *B60R 22/46* (2013.01)

(58) Field of Classification Search
CPC ...... B60R 22/46; B60R 22/105; B60R 22/343
See application file for complete search history.

(56) References Cited

U.S. PATENT DOCUMENTS

| 6,554,318 | B2 | 4/2003 | Kohut | |
|---|---|---|---|---|
| 2003/0132334 | A1 | 7/2003 | Koning | |
| 2003/0201359 | A1* | 10/2003 | Peter | B60R 22/343 |
| | | | | 242/390.9 |
| 2004/0195420 | A1* | 10/2004 | Schnabl | B60R 22/46 |
| | | | | 242/374 |
| 2005/0011980 | A1* | 1/2005 | Prokscha | B60R 22/44 |
| | | | | 242/374 |
| 2008/0087754 | A1 | 4/2008 | Aihara | |
| 2008/0105777 | A1* | 5/2008 | Holbein | B60R 22/46 |
| | | | | 242/379.1 |
| 2008/0315025 | A1 | 12/2008 | Singer | |
| 2015/0083842 | A1 | 3/2015 | Stegmeier | |

FOREIGN PATENT DOCUMENTS

| EP | 1031474 | 7/2000 |
|---|---|---|
| GB | 2371782 | 12/2001 |

* cited by examiner

*Primary Examiner* — Sang K Kim
(74) *Attorney, Agent, or Firm* — Frank A. MacKenzie; Bejin Bieneman PLC

(57) ABSTRACT

A seatbelt retractor assembly includes a disk having a cam surface and a cam follower surface. A lever that engages the cam surface when the lever is in a disengaged position and engages the cam follower surface when the lever is in an engaged position. The lever moves from the disengaged position to the engaged position in accordance with rotation of the disc. A Hall effect switch detects whether the lever is in the disengaged position or the engaged position.

16 Claims, 4 Drawing Sheets

LOAD LIMITING RETRACTOR WITH HALL EFFECT SWITCH

BACKGROUND

Seatbelts are designed to help secure a passenger to a vehicle seat. Modern seatbelts include locking retractors that permit some webbing payout during normal operation of the vehicle but will lock to prevent additional webbing payout in response to a sudden vehicle deceleration. Modern seatbelts sometimes also include a load limiter such as a torsion bar. The load limiter keeps the retractor locked during less severe crashes but will allow a small amount of additional webbing payout during more severe crashes, which reduces the force of the seatbelt on the occupant. For instance, the torsion bar may twist from the force of an occupant pressing against the seatbelt. If the force is high enough, the torsion bar will rotate to allow additional webbing payout and reduce the force applied to the occupant.

DETAILED DESCRIPTION

The seatbelt retractor assembly may be able to selectively engage and disengage the torsion bar which as discussed above may allow additional webbing payout during more severe vehicle crashes. When used in a rear seat, the torsion bar may be selectively engaged when, e.g., a child seat is present. For instance, an automatic locking restraint may be activated when the child seat is present, and the retractor may be selectively switched to a high load limiting state. An example seatbelt retractor assembly that can selectively activate the high load limiting state includes a disk having a cam surface and a cam follower surface. A lever engages the cam surface when the lever is in a disengaged position and engages the cam follower surface when the lever is in an engaged position. The lever moves from the disengaged position to the engaged position in accordance with rotation of the disk. A Hall effect switch detects whether the lever is in the disengaged position or the engaged position. The lever in the engaged position may indicate that a child seat is present. The Hall effect switch may output a signal to the restraint control module indicating that the lever is in the engaged position. In response, the restraint control module may generate and output a command signal that causes the retractor assembly to engage the torsion bar.

The elements shown may take many different forms and include multiple and/or alternate components and facilities. The example components illustrated are not intended to be limiting. Indeed, additional or alternative components and/or implementations may be used.

Figure 1:
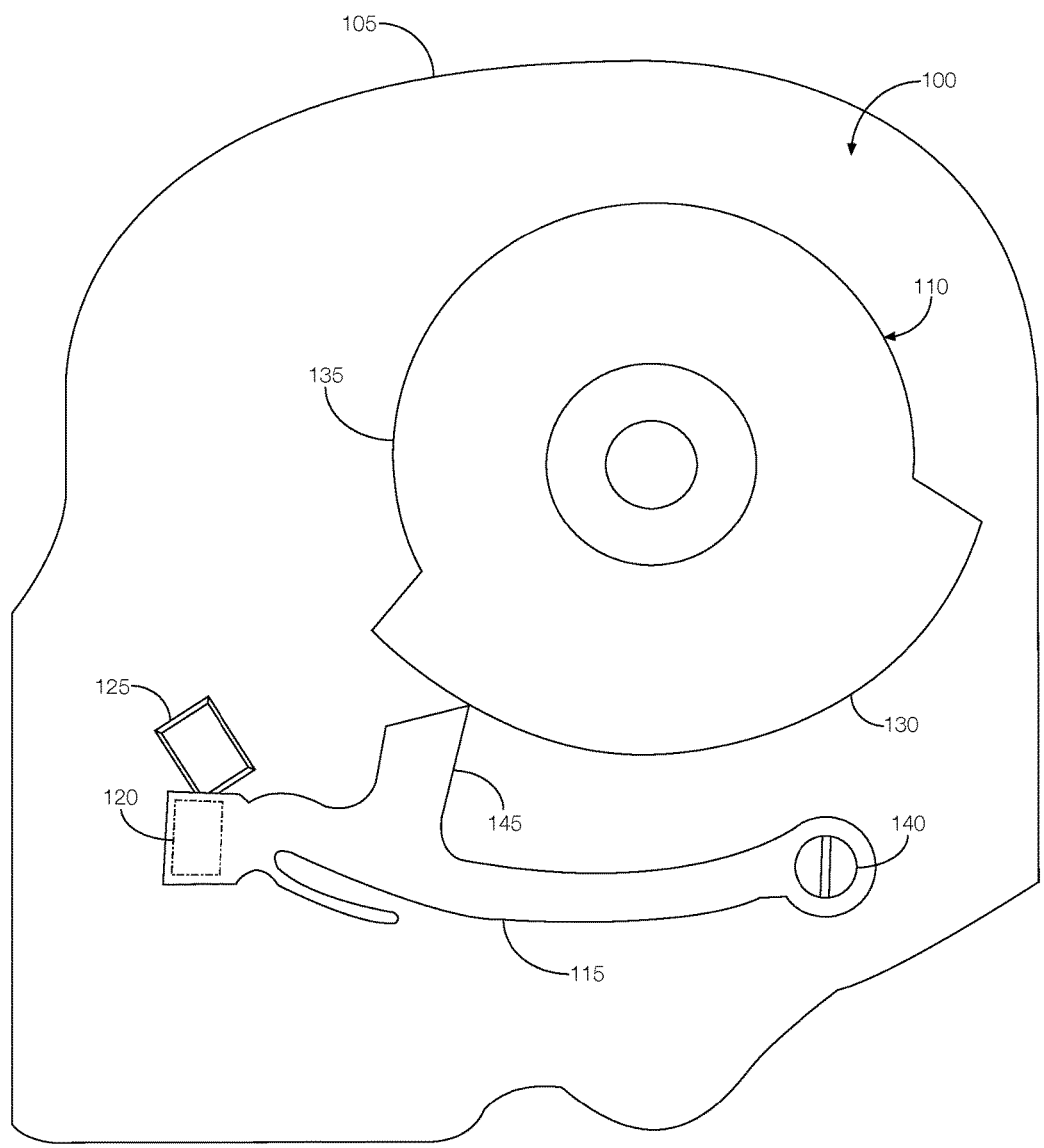
FIG. 1 illustrates an example load limiting retractor having a Hall effect switch spaced from a lever in a disengaged position.
Figure 2:
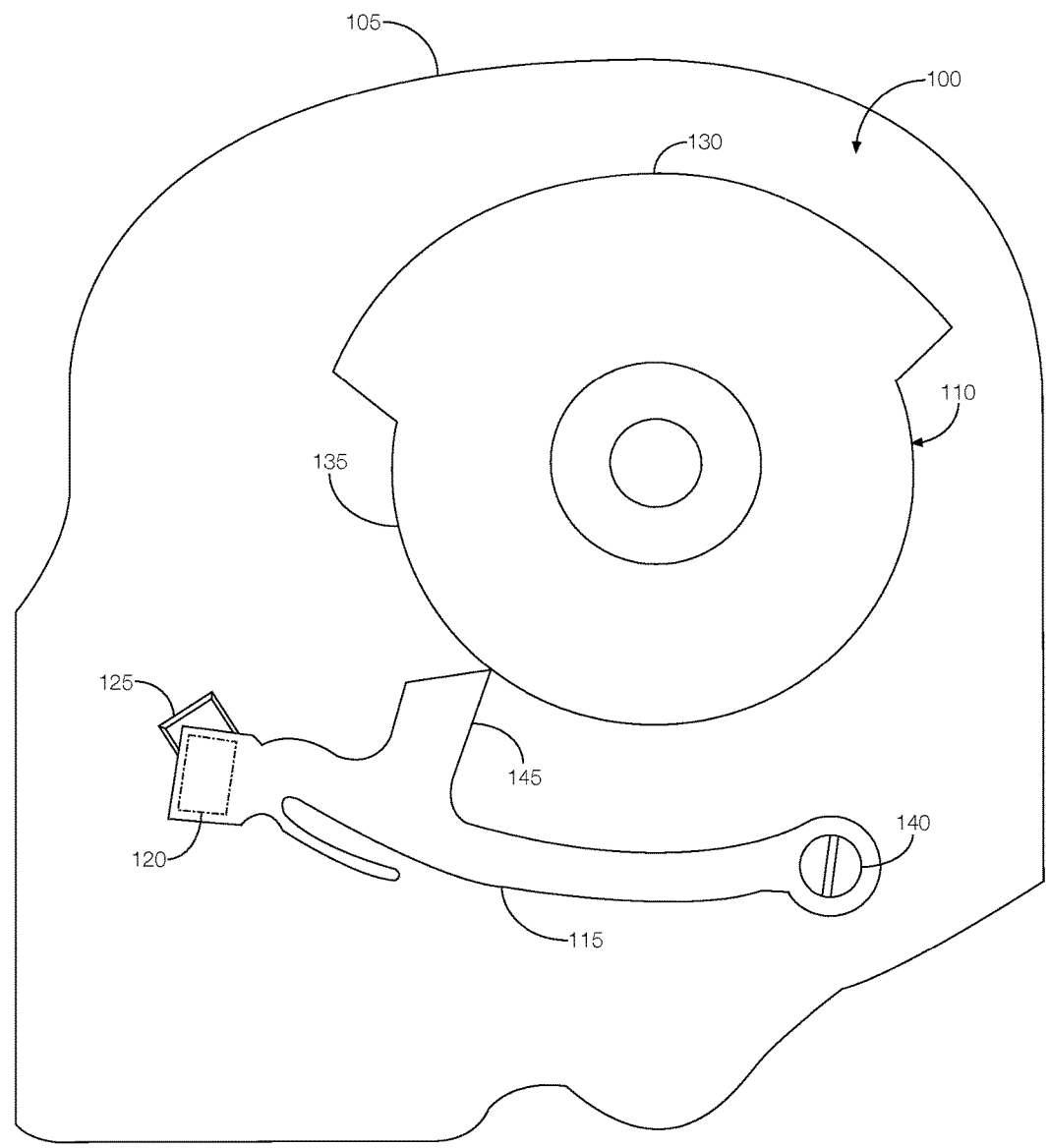
FIG. 2 illustrates an example load limiting retractor having a Hall effect switch spaced from a lever in an engaged position.

With reference to FIGS. 1 and 2, an example load limiting retractor assembly 100 includes a housing 105, a disk 110, a lever 115, a magnetic field generator 120, and a Hall effect switch 125. The load limiting retractor assembly 100 is configured to implement a load limiting feature in a seatbelt. That is, the load limiting retractor assembly 100 may lock (i.e., an automatic locking retractor feature may be activated) when the seatbelt webbing is fully extracted, which may occur when the seatbelt is used on a child seat. When the retractor is locked, the load limiting retractor assembly 100 may be configured to operate in a high load limiting state. For instance, the load limiting retractor may engage a torsion bar (not shown) that may rotate if enough force is applied to the seatbelt webbing. Such force may be generated during a crash. The rotation of the torsion bar may allow additional webbing payout or otherwise reduce the amount of force applied to the occupant, or in this case, the child seat.

The housing 105 may include any structure configured to house or store the various components of the load limiting retractor assembly 100 discussed above. The housing 105 may be formed from a generally rigid material such as metal or plastic. Some components of the load limiting retractor assembly 100 may be fastened or otherwise fixed to the housing 105. Certain components may be fixed to the housing 105 in a way that allows the component to move. For example, the disk 110 may be fixed to the housing 105 in a way that allows the disk 110 to rotate and the lever 115 may be fixed to the housing 105 in a way that permits the lever 115 to pivot about a fulcrum.

The disk 110 may include a relatively rigid structure configured to rotate relative to the housing 105. The disk 110 may include a cam surface 130 and a cam follower surface 135. The cam surface 130 may be raised relative to the cam follower surface 135. That is, assuming a generally circular base structure, and the cam surface 130 may extend from the base structure. The cam follower surface 135 may be defined by the base structure. Thus, the radius of the disk 110 may be greater at the cam surface 130 than the radius of the disk 110 at the cam follower surface 135. In some instances, the base structure, the cam surface 130, and the cam follower surface 135 may be integrally formed, part of a unitary structure, or both.

The lever 115 may include any structure configured to pivot relative to the housing 105. The lever 115 may be fastened to the housing 105 via, e.g., a fastener 140. The lever 115 may pivot relative to the housing 105 with the fastener 140 as a fulcrum. Moreover, the lever 115 may include an arm 145 configured to engage the disk 110. Alternatively, the lever 115 may engage the disk 110 without the arm 145. The lever 115 may pivot between an engaged position where the arm 145 is engaged with the cam follower surface 135 and a disengaged position where the arm 145 is engaged with the cam surface 130. The rotation of the disk 110 may cause the lever 115 to pivot between the engaged and disengaged positions.

The magnetic field generator 120 may include any device configured to generate a magnetic field. The magnetic field generator 120 may include, e.g., a permanent magnet. In one possible approach, the magnetic field generator 120 may be disposed on, and move with, the lever 115. Alternatively, the magnetic field generator 120 may be fixed to the housing 105.

The Hall effect switch 125 may include any electronic device programmed to detect whether the lever 115 is in the engaged or disengaged position. The Hall effect switch 125 may detect the magnetic field generator 120 when the lever 115 is in the engaged position, the disengaged position, or both. The Hall effect switch 125 may be disposed on the lever 115 or fixed to the housing 105. For instance, if the magnetic field generator 120 is disposed on the lever 115, the Hall effect switch 125 may be located on the housing 105 at a location near where the magnetic field generator 120 is located when the lever 115 is in the engaged position. Alternatively, the magnetic field generator 120 may be fixed to the housing 105 at a location near where the Hall effect switch 125 is located when the lever 115 is in the engaged position. The Hall effect switch 125 may sense the magnetic field generated by the magnetic field generator 120, and in response to detecting the magnetic field, generate and output a lockout signal when the lever 115 is in the engaged position (i.e., when the Hall effect switch 125 is near the magnetic field generator 120). The lockout signal may be transmitted to a restraint control module, as discussed in greater detail below.

FIGS. 1 and 2 illustrate the Hall effect switch 125 fixed to the housing 105 and the magnetic field generator 120 disposed on the lever 115. FIG. 1 shows the lever 115 in the disengaged position. That is, the arm 145 of the lever 115 is engaged with the cam surface 130, which causes the lever 115, and thus the magnetic field generator 120, to pivot to the disengaged position away from the Hall effect switch 125. FIG. 2 illustrates the lever 115 in the engaged position. In FIG. 2, the arm 145 of the lever 115 is engaged with the cam follower surface 135, which causes the lever 115, and thus the magnetic field generator 120, to pivot to the engaged position toward the Hall effect switch 125. When in the engaged position, the Hall effect switch 125 is close enough to detect the magnetic field generated by the magnetic field generator 120. Upon detection of the magnetic field, the Hall effect switch 125 may generate and output the lockout signal.

Figure 3:
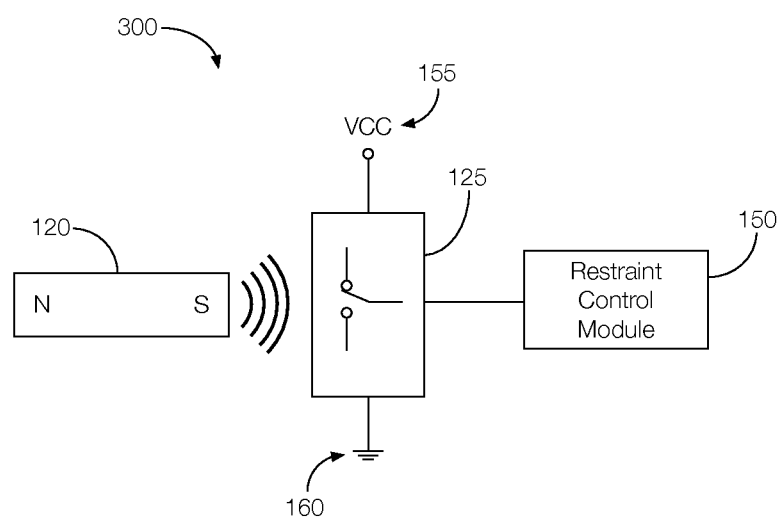
FIG. 3 is a circuit diagram showing an example interface between the Hall effect switch and a restraint control module.

FIG. 3 is a simplified circuit diagram 300 showing an example interface between the Hall effect switch 125 and a restraint control module 150. In addition, the circuit diagram 300 includes a power source 155 and a ground potential 160. A positive terminal of the Hall effect switch 125 is electrically connected to the power source 155 and a negative terminal of the Hall effect switch 125 is electrically connected to the ground potential 160. The Hall effect switch 125 further includes an output terminal. When the magnetic field generator 120 is close to the Hall effect switch 125, the Hall effect switch 125 closes to output the lockout signal to the restraint control module 150.

Figure 4:
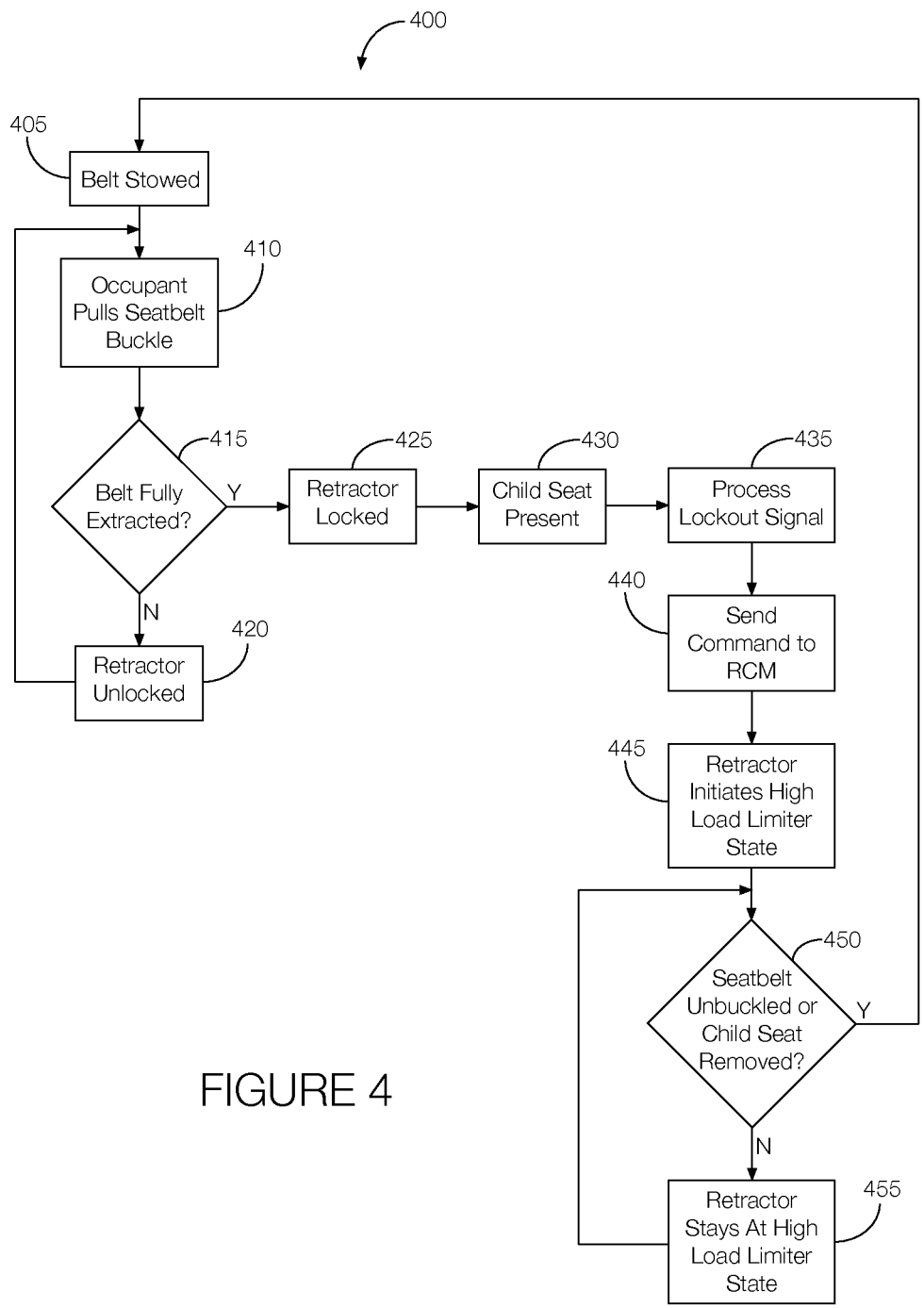
FIG. 4 is a flowchart of an example process that may be executed by the restraint control module.

FIG. 4 is a flowchart of an example process 400 that may be executed by the restraint control module 150. At block 405, the restraint control module 150 detects that the seatbelt is in the stowed position, and at block 410, the restraint control module 150 detects that the occupant has pulled the seatbelt to, e.g., at least partially extract the seatbelt from the retractor. At decision block 415, the restraint control module 150 determines whether the seatbelt has been fully extracted from the retractor. A fully extracted seatbelt may indicate the presence of a child seat. If the seatbelt has not been fully extracted, the process 400 may proceed to block 420 where the retractor remains unlocked during normal operation of the vehicle. If the seatbelt has been fully extracted, the process 400 may proceed to block 425 where the retractor is locked, e.g., the automatic locking retractor is activated. At block 430, the restraint control module 150 may determine that a child seat is present based on, e.g., the seatbelt being fully extracted from the retractor, the amount of weight on the seat, and potentially other factors. If the child seat is present, the Hall effect switch 125 may output the lockout signal to the restraint control module 150. Thus, the restraint control module 150 may determine whether the child seat is present based at least in part on whether it received the lockout signal from the Hall effect switch 125. At block 435, the restraint control module 150 may process the lockout signal, and at block 440, the restraint control module 150 may output a command signal to the retractor so that the retractor can switch to a high load limiter state, as shown at block 445. At decision block 450, the restraint control module 150 may detect whether the seatbelt is unbuckled or the child seat is removed. If so, the process 400 may return to block 405. If the child seat and seatbelt remain unchanged, the process 400 may proceed to block 455. At block 455, the restraint control module 150 may keep the retractor at the high load limiter state. The process 400 may continue to execute blocks 450 and 455 until the child seat or seatbelt status changes or until the vehicle is turned off.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A seatbelt retractor assembly comprising:
a disk having a cam surface and a cam follower surface;
a lever having a fulcrum spaced from the disk, wherein the lever is configured to engage the cam surface when the lever is in a disengaged position and engage the cam follower surface when the lever is in an engaged position, wherein the lever is configured to rotate about the fulcrum to move from the disengaged position to the engaged position in accordance with rotation of the disc;
a magnetic field generator disposed on the lever and spaced from the fulcrum of the lever, wherein the magnetic field generator is configured to generate a magnetic field; and
a Hall effect switch configured to detect whether the lever is in the disengaged position or the engaged position.

2. The seatbelt retractor assembly of claim 1, further comprising a housing, and wherein the disk, the lever, and the Hall effect switch are disposed on the housing.

3. The seatbelt retractor assembly of claim 1, wherein the Hall effect switch is disposed on the housing and configured to detect the magnetic field generated by the magnetic field generator when the lever is in the engaged position.

4. The seatbelt retractor assembly of claim 1, wherein the magnetic field generator includes a permanent magnet.

5. The seatbelt retractor assembly of claim 1, wherein the Hall effect switch is programmed to output a lockout signal when the lever is in the engaged position.

6. The seatbelt retractor assembly of claim 5, wherein the lockout signal represents a child seat located in at least one rear vehicle seat.

7. The seatbelt retractor assembly of claim 5, wherein the Hall effect switch is configured to transmit the lockout signal to a restraint control module.

8. The seatbelt retractor assembly of claim 5, wherein outputting the lockout signal initiates a high load limiter retractor state.

9. The seatbelt retractor assembly of claim 5, wherein the disk is rotated based at least in part on a webbing payout, and wherein rotating the disk moves the lever between the disengaged position and the engaged position.

10. A seatbelt retractor assembly comprising:
a disk having a cam surface and a cam follower surface and configured to rotate in accordance with a seatbelt webbing payout;
a lever having a fulcrum spaced from the disk, wherein the lever is configured to engage the cam surface of the disk when the lever is in a disengaged position and engage the cam follower surface when the lever is in an engaged position, wherein the lever is configured to rotate about the fulcrum to move from the disengaged position to the engaged position in accordance with rotation of the disk;
a magnetic field generator disposed on the lever and spaced from the fulcrum of the lever, wherein the magnetic field generator is configured to generate a magnetic field; and
a Hall effect switch configured to detect whether the lever is in the disengaged position or the engaged position based on a proximity of the magnetic field generator to the Hall effect switch.

11. The seatbelt retractor assembly of claim 10, further comprising a housing, and wherein the disk, the lever, and the Hall effect switch are disposed on the housing.

12. The seatbelt retractor assembly of claim 10, wherein the magnetic field generator includes a permanent magnet.

13. The seatbelt retractor assembly of claim 10, wherein the Hall effect switch is programmed to output a lockout signal when the lever is in the engaged position.

14. The seatbelt retractor assembly of claim 13, wherein the lockout signal represents a child seat located in at least one rear vehicle seat.

15. The seatbelt retractor assembly of claim 13, wherein the Hall effect switch is configured to transmit the lockout signal to a restraint control module.

16. The seatbelt retractor assembly of claim 13, wherein outputting the lockout signal initiates a high load limiter retractor state.

* * * * *